(12) United States Patent
Sugahara et al.

(10) Patent No.: US 10,407,752 B2
(45) Date of Patent: Sep. 10, 2019

(54) LIQUID-LIQUID EXTRACTION UNIT, MULTISTAGE LIQUID-LIQUID EXTRACTION APPARATUS USING THE UNIT, AND MULTISTAGE CONTINUOUS EXTRACTION SYSTEM FOR RARE EARTH ELEMENTS

(71) Applicant: SHIN-ETSU CHEMICAL CO., LTD., Tokyo (JP)

(72) Inventors: Hiroto Sugahara, Echizen (JP); Takehisa Minowa, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 347 days.

(21) Appl. No.: 15/195,382

(22) Filed: Jun. 28, 2016

(65) Prior Publication Data

US 2016/0304986 A1    Oct. 20, 2016

Related U.S. Application Data

(62) Division of application No. 13/738,393, filed on Jan. 10, 2013.

(30) Foreign Application Priority Data

Jan. 13, 2012    (JP) ................... 2012-005224

(51) Int. Cl.
*C22B 3/26*    (2006.01)
*B01D 11/04*    (2006.01)
(Continued)

(52) U.S. Cl.
CPC ............ *C22B 3/0005* (2013.01); *B01D 11/04* (2013.01); *B01D 11/0449* (2013.01);
(Continued)

(58) Field of Classification Search
CPC ... B01D 2011/005; B01D 11/04; C22B 59/00; C22B 3/0005
See application file for complete search history.

(56) References Cited

U.S. PATENT DOCUMENTS 2,361,780 A * 10/1944 Lewis ................ B01D 11/0473
                                                        196/14.52
2,631,780 A    9/1949 Branner
(Continued)

FOREIGN PATENT DOCUMENTS

EP    0 073 415 A2    3/1983
FR    2 276 853 A1    1/1976
(Continued)

OTHER PUBLICATIONS

Extended European Search Report dated May 27, 2013, issued in corresponding European Patent Application No. 13150119.9.
(Continued)

*Primary Examiner* — Donald R Spamer
(74) *Attorney, Agent, or Firm* — Westerman, Hattori, Daniels & Adrian, LLP

(57) ABSTRACT

A liquid-liquid extraction unit includes an extraction/separation tank (10) into which an aqueous phase in bubble form is admitted from an upper inlet (20) in one sidewall and an organic phase in bubble form is admitted from a lower inlet (30) in the one sidewall. The upward moving organic phase is contacted with the downward moving aqueous phase. After contact, the organic phase is discharged through an upper outlet (40) in an opposite sidewall and the aqueous phase is discharged through a lower outlet (50) in the opposite sidewall.

13 Claims, 5 Drawing Sheets

(51) Int. Cl.
*C22B 59/00* (2006.01)
*B01D 11/00* (2006.01)

(52) U.S. Cl.
CPC ........ *C22B 59/00* (2013.01); *B01D 2011/002* (2013.01); *Y02P 10/234* (2015.11)

(56) References Cited

U.S. PATENT DOCUMENTS

| | | | |
|---|---|---|---|
| 2,646,346 | A | 7/1953 | Coplan et al. |
| 3,997,445 | A | 12/1976 | Hannestad |
| 4,081,354 | A | 3/1978 | Christman |
| 4,491,549 | A | 1/1985 | Fischer et al. |
| 5,030,424 | A * | 7/1991 | Fulford .................. C01F 7/066 423/111 |
| 8,177,881 | B2 | 5/2012 | Sugahara et al. |
| 2010/0319491 | A1 | 12/2010 | Sugahara et al. |

FOREIGN PATENT DOCUMENTS

| | | |
|---|---|---|
| GB | 835282 A | 5/1960 |
| JP | 2008-289975 A | 12/2008 |
| JP | 2011-1583 A | 1/2011 |
| JP | 2011-1584 A | 1/2011 |
| JP | 2011-1586 A | 1/2011 |

OTHER PUBLICATIONS

European Examination Report dated Sep. 9, 2016, issued in counterpart European Patent Application No. 13 150 119.9. (4 pages).

* cited by examiner

LIQUID-LIQUID EXTRACTION UNIT, MULTISTAGE LIQUID-LIQUID EXTRACTION APPARATUS USING THE UNIT, AND MULTISTAGE CONTINUOUS EXTRACTION SYSTEM FOR RARE EARTH ELEMENTS

CROSS-REFERENCE TO RELATED APPLICATION

This application is a divisional application of U.S. patent application Ser. No. 13/738,393 filed on Jan. 10, 2013, which is a non-provisional application which is based on and claims priority under 35 U.S.C. § 119(a) on Patent Application No. 2012-005224 filed in Japan on Jan. 13, 2012, the entire contents of which are hereby incorporated by reference.

TECHNICAL FIELD

This invention relates to a liquid-liquid extraction unit adapted to contact an aqueous phase with an organic phase, separate them, and recover the desired extract from the thus separated aqueous phase and/or organic phase, more particularly, to a liquid-liquid extraction unit suitable for the extraction and separation of rare earth elements, especially rare earth elements including yttrium and light rare earth elements (La, Ce, Pr, Nd, Sm, and Eu); a multistage liquid-liquid extraction apparatus and a multistage continuous extraction system using the unit.

BACKGROUND ART

Nowadays, rare earth magnets as typified by Nd magnets are widely used in motors, sensors and other parts built in hard disk drives, air conditioners, hybrid cars, and the like.

Typical rare earth elements used in rare earth magnets include cerium (Ce), praseodymium (Pr), neodymium (Nd), samarium (Sm), terbium (Tb) and dysprosium (Dy). For the separation of these rare earth elements, the ion exchange resin (or solid-liquid extraction) method and the solvent extraction (or liquid-liquid extraction) method are known. The solvent extraction method is often used in the industrial separation and purification of rare earth elements because the method is capable of efficient large-scale treatment due to continuous steps. In the solvent extraction method, a water phase consisting of an aqueous solution containing metal elements to be separated is contacted with an organic phase consisting of an extractant for extracting a metal element of interest and an organic solvent for diluting the extractant. Then the metal element of interest is extracted with the extractant into the organic phase for separation.

Extraction apparatus known in the art for use in extracting rare earth elements by the solvent extraction (or liquid-liquid extraction) method include a multistage continuous extraction system comprising a plurality of mixer-settlers as shown in FIG. 5 (see Patent Documents 1, 2 and 3). Illustrated in FIG. 5 are an extraction section A for extracting a selected rare earth element from an aqueous phase into an organic phase, a scrubber section B for scrubbing the organic phase, and a back extraction section C for back extracting the rare earth element once extracted in the organic phase into an aqueous phase for recovery. Arrows 1 to 9 indicate lines and flows of aqueous phase, organic phase, and reagents into and out of the mixer-settlers.

A rare earth element-containing aqueous phase from line 1, an extractant-containing organic phase from line 2, and an alkaline aqueous solution from line 3 are fed into the mixer-settler of extraction section A, where the steps of mixing aqueous and organic phases, stationary holding and separating them again are repeated in multiple stages, whereby the rare earth element of interest is extracted from the aqueous phase into the organic phase, which is fed to scrubber section B. The aqueous phase is discharged via line 5, and the rare earth element which remains in the aqueous phase without being extracted into the organic phase is recovered from this aqueous phase. The alkaline aqueous solution from line 3 is fed for adjusting the equilibrium acid concentration.

In scrubber section B, an acid aqueous solution is fed from line 4 as the aqueous phase into the mixer-settler, where the steps of mixing the acid aqueous solution (aqueous phase) 4 with the organic phase having the rare earth element extracted therein in extraction section A, stationary holding and separating them again are repeated in multiple stages. The organic phase 2 is scrubbed or washed in that only the rare earth element, which is contained in the organic phase 2 and should essentially remain in the aqueous phase in extraction section A, is selectively extracted into the acid aqueous solution (aqueous phase) 4, after which the organic phase 2 is delivered to back-extraction section C. On the other hand, the acid aqueous solution (aqueous phase) having only the rare earth element, which should essentially remain in the aqueous phase in extraction section A, selectively extracted therein is discharged via line 9, and fed back to extraction section A. Notably, the acid aqueous solution 4 is adjusted to such an acid concentration that only the rare earth element, which is dissolved in a minor amount in the organic phase 2 and should remain in the aqueous phase, may be selectively extracted.

In back extraction section C, the acid aqueous solution which is adjusted to a sufficient concentration to extract the rare earth element of interest is fed from line 6 as the aqueous phase to the mixer-settler where the steps of mixing the acid aqueous solution (or aqueous phase) 6 with the organic phase 2 scrubbed in scrubber section B, stationary holding and separating them again are repeated in multiple stages, whereby the rare earth element of interest contained in the organic phase 2 is back extracted into the acid aqueous solution (aqueous phase) 6, which is discharged via line 7. The rare earth element of interest is recovered from this acid aqueous solution (aqueous phase) 7. On the other hand, the organic phase 2 from which the rare earth element has been removed by back-extraction is discharged from back-extraction section C and fed back via line 8 to extraction section A for circulation.

In the prior art, a mixer-settler is used to construct each of extraction section A, scrubber section B, and back-extraction section C of the multistage continuous extraction system. For example, a mixer-settler of an arrangement as shown in FIG. 6 is commonly used.

As shown in FIG. 6, the mixer-settler comprises a plurality of liquid-liquid extraction units k connected in fluid communication, each unit having one mixer chamber f with a propeller e mounted therein and four settler chambers g to j connected in series. In the embodiment of FIG. 6, four liquid-liquid extraction units k are connected in four stages. With this mixer-settler, extraction operation is carried out as follows. The flows of aqueous phase are depicted by solid line arrows and the flows of organic phase depicted by broken line arrows. The aqueous phase and organic phase flow in mixer chamber f where they are stirred and mixed by rotating propeller e, then flow in settler chamber g where they dwell for a certain time, that is, the mixture is kept substantially stationary and gradually separates into aqueous and organic phases again. These aqueous and organic phases successively and moderately transfer from settler chamber g to j while separation between aqueous and organic phases proceeds in progress. In the last settler j, the organic and aqueous phases are separated and discharged whereupon they flow into mixer chambers f of liquid-liquid extraction units k of the subsequent stages. Similar operation is repeated in plural stages (four stages in FIG. 6). As shown by solid line arrows (aqueous phase) and broken line arrows (organic phase) in FIG. 6, the aqueous phase and organic phase flow in counter-current, thereby enhancing the transfer rate of extract between aqueous and organic phases, and achieving a high extraction rate.

The multistage continuous extraction system using such mixer-settlers achieves a very high separation efficiency in excess of 99%, enabling separation and recovery of rare earth elements at a very high efficiency. In an example where praseodymium (Pr) and neodymium (Nd) are separated and recovered using mono-2-ethylhexyl 2-ethylhexylphosphate (PC-88A by Daihachi Chemical Industry Co., Ltd.), the system should include extraction section A of 32 stages, scrubber section B of 32 stages, and back extraction section C of 8 stages, summing to 72 stages in total. That is, liquid-liquid extraction units k each having five chambers, one mixer chamber f and four settler chambers g to j are connected in 72 stages in total to construct the multistage continuous extraction system.

As a consequence, the multistage continuous extraction system for separating and extracting rare earth elements becomes a very large scale installation, requiring a very large footprint. A very large volume of liquid is necessary to fill all the chambers of the system therewith. Accordingly, a size reduction of the system would become a great contribution to cost reduction. It is desirable to reduce the size of the system without any loss of separation efficiency.

CITATION LIST

Patent Document 1: JP-A 2011-001583
Patent Document 2: JP-A 2011-001584
Patent Document 3: JP-A 2011-001586
Patent Document 4: JP-A 2008-289975

SUMMARY OF INVENTION

An object of the invention is to provide a liquid-liquid extraction unit which can be reduced in size without sacrificing the efficiency of extraction and separation of rare earth elements, a multistage liquid-liquid extraction apparatus using the unit, and a multistage continuous extraction system comprising a plurality of multistage liquid-liquid extraction apparatus.

The inventors have found the following. Liquid-liquid extraction is carried out by feeding an aqueous phase and an organic phase into a tank, contacting them, separating them, and recovering the desired extract from the thus separated aqueous phase and/or organic phase. The aqueous phase in bubble form is admitted into the tank from an upper portion thereof, and the organic phase in bubble form is admitted into the tank from a lower portion thereof. The organic phase moving from the lower interior to the upper interior of the tank is contacted with the aqueous phase moving from the upper interior to the lower interior of the tank for transferring the desired substance between aqueous and organic phases. The organic phase is discharged from the upper interior of the tank, and the aqueous phase is discharged from the lower interior of the tank. The desired extract is recovered from the discharged organic and/or aqueous phase. When the bubbly aqueous phase and the bubbly organic phase exchange their position vertically upward and downward, they are effectively contacted with each other so that effective extraction takes place via interfacial reaction, and phase separation proceeds at the same time. Then extraction can be carried out in a small-volume, small-area tank without a need for a large-volume settler chamber as in a mixer-settler, and without any loss of efficiency.

However, in the prior art method wherein aqueous and organic phases are contacted and separated solely via vertical upward and downward movements using a well-known spray column or a vertical cylindrical tank used in an extraction unit based on emulsion flow as described in Patent Document 4, reaction cannot catch up at a high flow rate equivalent to the flow rate available in the above-mentioned mixer-settler. Thus reaction must be carried out at a low flow rate in order to maintain an acceptable efficiency, resulting in a loss of processing efficiency.

Continuing the research, the inventors have found the following. An extraction/separation tank having a pair of horizontally opposed sidewalls is provided with an aqueous phase inlet at an upper portion of one sidewall, an organic phase inlet at a lower portion of one sidewall, an organic phase outlet at an upper portion of the opposite sidewall, and an aqueous phase outlet at a lower portion of the opposite sidewall. The organic and aqueous phases are admitted from the horizontal one sidewall side, move horizontally while exchanging their position vertically upward and downward, and are discharged from the other sidewall side. In this arrangement, a high flow rate equivalent to the flow rate available in the prior art mixer-settler is achievable while maintaining an acceptable efficiency. The size can be significantly reduced as compared with the prior art mixer-settler. When a multistage continuous extraction system for extracting and separating rare earth elements is constructed, the footprint can be significantly reduced. The volume of liquid necessary for extraction can be significantly reduced. These contribute to a substantial reduction of cost. The invention is predicated on these findings.

In one aspect, the invention provides a liquid-liquid extraction unit adapted to contact an aqueous phase with an organic phase, separate them, and recover a desired extract from the thus separated aqueous phase and/or organic phase, comprising an extraction/separation tank for receiving the aqueous phase and the organic phase, having a pair of horizontally opposed sidewalls, an aqueous phase inlet disposed at an upper portion of one sidewall for admitting the aqueous phase in bubble form, an organic phase inlet disposed at a lower portion of one sidewall for admitting the organic phase in bubble form, an organic phase outlet disposed at an upper portion of the other sidewall for discharging the separated organic phase, and an aqueous phase outlet disposed at a lower portion of the other sidewall for discharging the separated aqueous phase.

The aqueous phase in bubble form is admitted from the aqueous phase inlet to an upper interior of the tank, the organic phase in bubble form is admitted from the organic phase inlet to an lower interior of the tank, the organic phase moving from the lower interior to the upper interior of the tank is contacted with the aqueous phase moving from the upper interior to the lower interior of the tank, the organic phase after contact is discharged and recovered through the organic phase outlet, and the aqueous phase after contact is discharged and recovered through the aqueous phase outlet.

The liquid-liquid extraction unit may further comprise a partition disposed between the horizontally opposed sidewalls for dividing the tank into a contact compartment and a separation/recovery compartment, the contact compartment facing the aqueous phase inlet and the organic phase inlet, the separation/recovery compartment facing the organic phase outlet and the aqueous phase outlet, and means disposed above or in an upper portion and below or in a lower portion of the partition for providing fluid communication between the contact compartment and the separation/recovery compartment.

In a preferred embodiment, the extraction/separation tank is a parallelepiped tank having a rectangular bottom and a pair of longitudinally opposed sidewalls as the pair of horizontally opposed sidewalls.

In another aspect, the invention provides a multistage liquid-liquid extraction apparatus comprising a plurality of liquid-liquid extraction units as defined above, wherein the organic phase outlet of one unit is connected to the organic phase inlet of another unit, and the aqueous phase outlet of the one unit is connected to the aqueous phase inlet of the other unit, so that contact and separation is carried out in multiple stages.

In a further aspect, the invention provides a multistage continuous extraction system for extracting a rare earth element, comprising an extraction section for contacting an aqueous phase in the form of an aqueous solution containing rare earth elements with an organic phase containing an extractant, and separating them for thereby extracting at least one rare earth element into the organic phase, and a back-extraction section for contacting the organic phase having at least one rare earth element extracted therein with an aqueous phase in the form of an acid aqueous solution and separating them for thereby back extracting the rare earth element into the aqueous phase for recovery, wherein the organic phase after back extraction is discharged from the back-extraction section and fed back to the extraction section for circulation, one or both of the extraction section and the back-extraction section being a multistage liquid-liquid extraction apparatus as defined above.

Preferably, the aqueous phase after extraction is discharged from the extraction section and recovered so that the rare earth element which remains in the aqueous phase without being extracted into the organic phase may be recovered.

In a still further aspect, the invention provides a multistage continuous extraction system for extracting a rare earth element, comprising an extraction section for contacting an aqueous phase in the form of an aqueous solution containing rare earth elements with an organic phase containing an extractant, and separating them for thereby extracting a first rare earth element into the organic phase, a back-extraction section for contacting the organic phase having the rare earth element extracted therein with an aqueous phase in the form of an acid aqueous solution and separating them for thereby back extracting the first rare earth element into the aqueous phase for recovery, and a scrubber section disposed between the extraction section and the back-extraction section for scrubbing the organic phase discharged from the extraction section by contacting the organic phase with an aqueous phase in the form of an acid aqueous solution having a predetermined acid concentration and separating them for thereby selectively extracting a second rare earth element, which is incidentally contained in the organic phase and should remain in the aqueous phase of the extraction section, into the aqueous phase, and for delivering the organic phase after scrubbing to the back-extraction section.

The aqueous phase having the second rare earth element extracted from the organic phase in the scrubber section is fed back to the extraction section, the organic phase after back-extraction is discharged from the back-extraction section and fed back to the extraction section for circulation; the aqueous phase discharged from the extraction section is recovered for thereby recovering a third rare earth element remaining in the aqueous phase without being extracted into the organic phase; at least one of the extraction section, the back-extraction section and the scrubber section being a multistage liquid-liquid extraction apparatus as defined above.

Advantageous Effects of Invention

The liquid-liquid extraction unit of the invention is of small size and maintains a sufficient extraction efficiency. When a multistage extraction apparatus comprising a plurality of units connected for fluid communication and a multistage continuous extraction system in which a plurality of sections each comprising the multistage extraction apparatus and assigned to different steps are connected for fluid communication are constructed, the footprint can be significantly reduced, and the volume of liquid necessary for extraction can be significantly reduced. These contribute to a substantial reduction of cost required for extraction and separation of rare earth elements.

DESCRIPTION OF EMBODIMENTS

Figure 1:
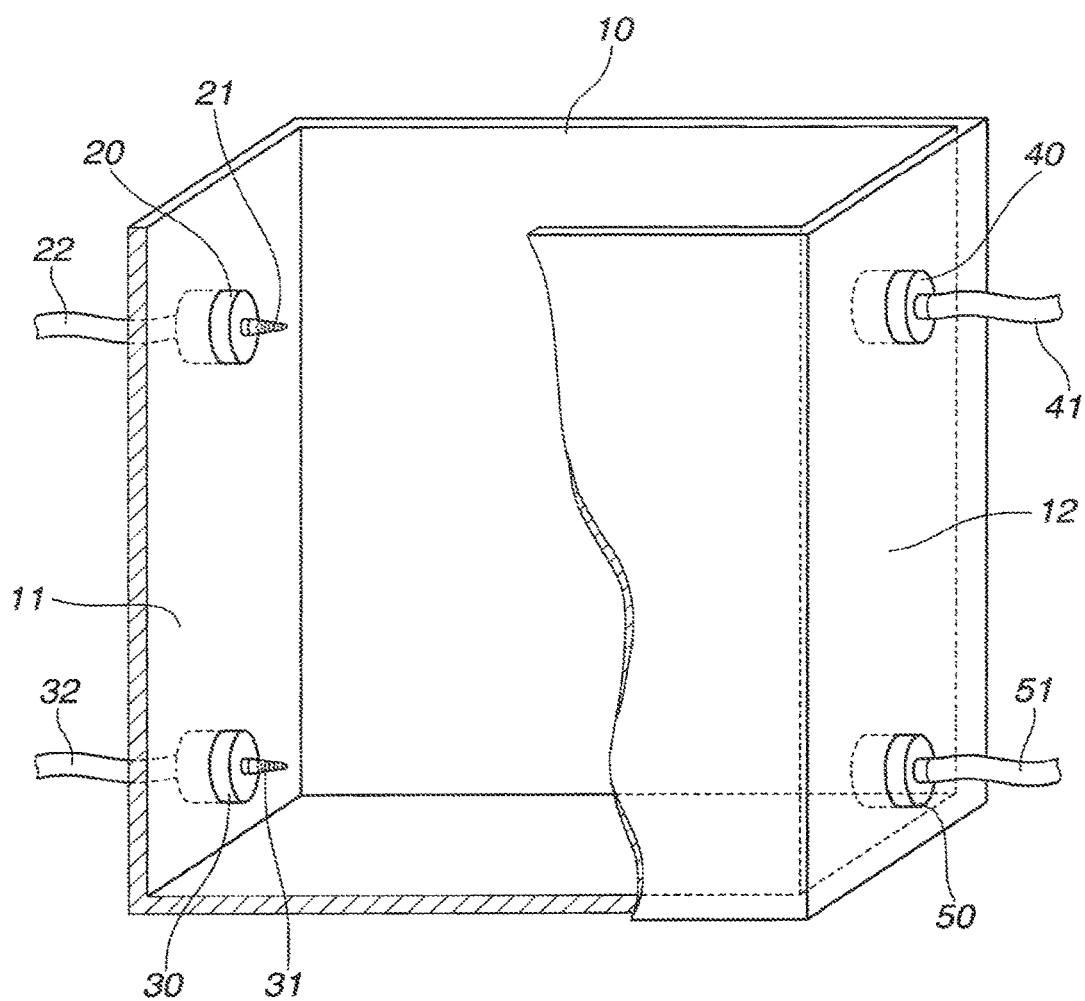
FIG. 1 is a schematic perspective, partially cutaway, view of one exemplary liquid-liquid extraction unit in one embodiment of the invention.

FIG. 1 schematically illustrates one exemplary liquid-liquid extraction unit in one embodiment of the invention. The unit includes an extraction/separation tank 10 for receiving aqueous and organic phases. Specifically the tank 10 is a parallelepiped vessel having a rectangular bottom, an open top, a pair of horizontally and longitudinally opposed sidewalls 11 and 12, and a pair of horizontally and transversely opposed sidewalls.

One sidewall 11 of tank 10 is provided with an aqueous phase inlet 20 in an upper portion thereof and an organic phase inlet 30 in a lower portion thereof. The aqueous phase inlet 20 and organic phase inlet 30 include spray nozzles 21 and 31 projecting into the tank 10. The spray nozzles 21 and 31 are extended through sidewall 11 and connected to an aqueous phase feed line 22 and an organic phase feed line 32, respectively. The aqueous phase is pumped by a pump (not shown) through feed line 22 and admitted into tank 10 via upper spray nozzle 21. Similarly, the organic phase is pumped by a pump (not shown) through feed line 32 and admitted into tank 10 via lower spray nozzle 31.

Figure 2:
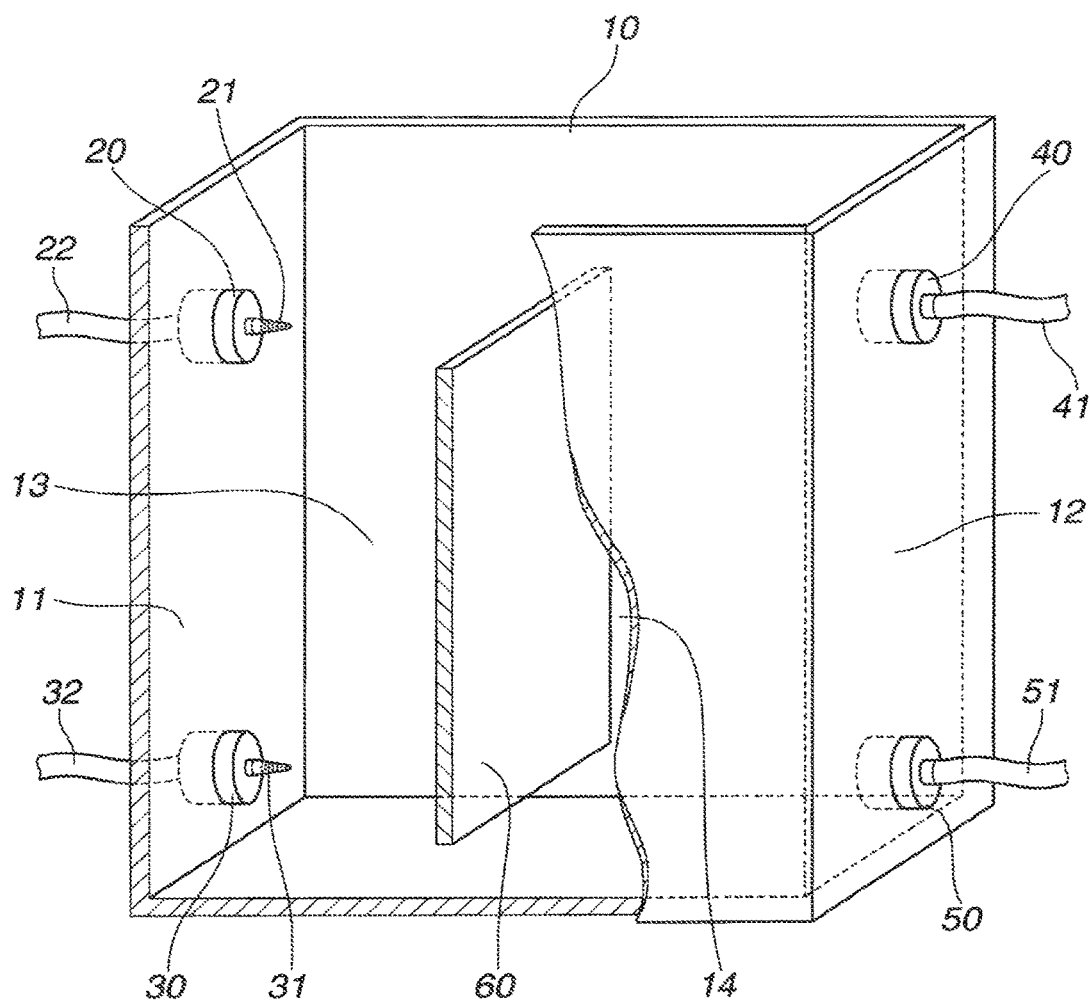
FIG. 2 is a schematic perspective, partially cutaway, view of another exemplary liquid-liquid extraction unit in one embodiment of the invention.

The spray nozzles 21 and 31 have a plurality of orifices in a distal circumferential surface, through which the aqueous phase and organic phase are injected in bubble form into the interior of tank 10. The distal shape of the spray nozzle is preferably conical (as spray nozzles 21, 31 are depicted in FIGS. 1 and 2) when a high injection speed is desired. The distal shape of the spray nozzle is not limited to conical shape, and may be flared when spraying of the aqueous and organic phases over a wide area is desired.

The other sidewall 12 of tank 10 is provided with an organic phase outlet 40 in an upper portion thereof and an aqueous phase outlet 50 in a lower portion thereof. The organic phase outlet 40 and aqueous phase outlet 50 include discharge ports (not shown) which penetrate through the sidewall 12 and are connected to an organic phase discharge line 41 and an aqueous phase discharge line 51, respectively. By a pump (not shown) connected in organic phase discharge line 41, the organic phase is discharged from the upper interior of tank 10 to organic phase discharge line 41. Similarly, by a pump (not shown) connected in aqueous phase discharge line 51, the aqueous phase is discharged from the lower interior of tank 10 to aqueous phase discharge line 51. In case tank 10 is used alone, the pumps for discharging the organic and aqueous phases through organic phase discharge line 41 and aqueous phase discharge line 51 may be omitted, and the organic and aqueous phases may be discharged as flow under gravity through organic phase discharge line 41 and aqueous phase discharge line 51.

Figure 3:
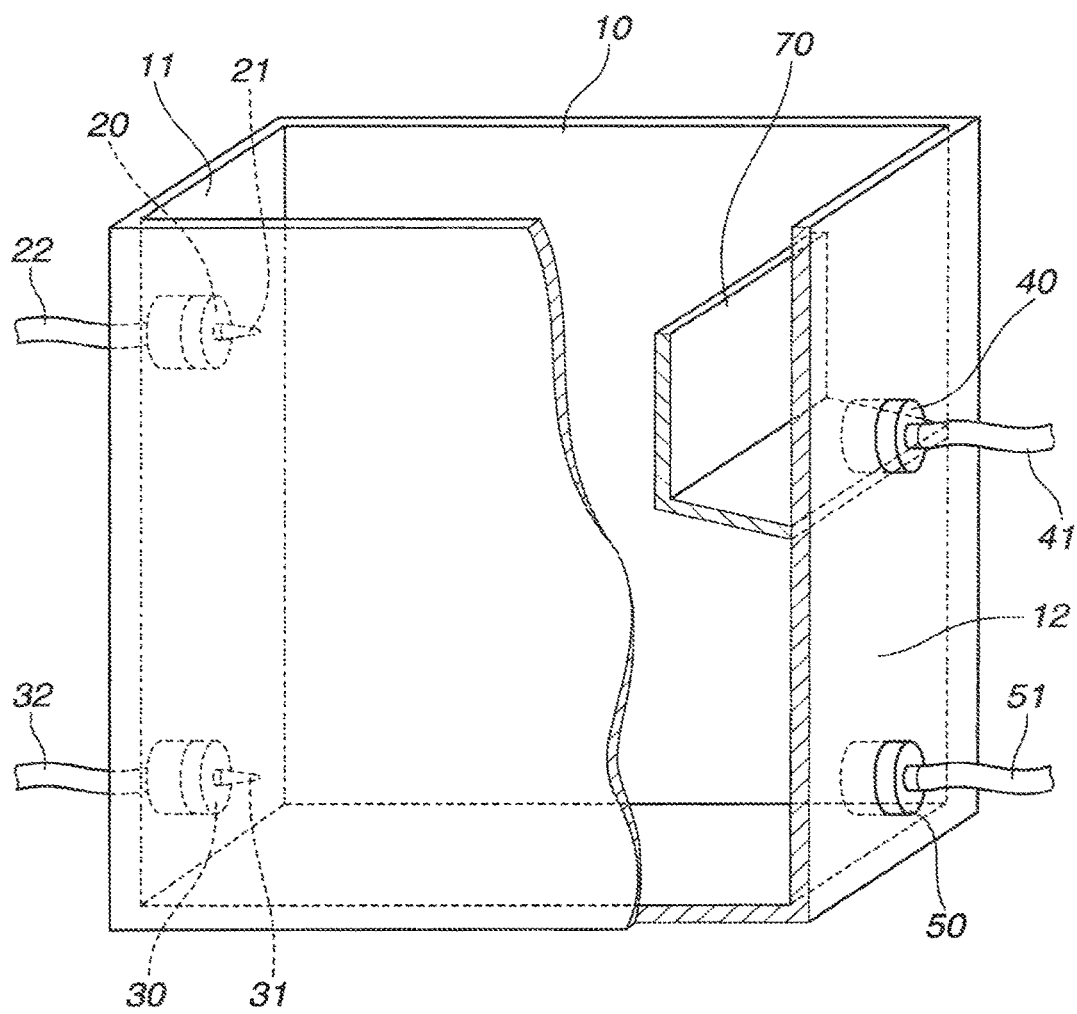
FIG. 3 is a schematic perspective, partially cutaway, view of a further exemplary liquid-liquid extraction unit in one embodiment of the invention.

Though not critical, it is preferred that the organic phase outlet 40 be disposed at a slightly higher position than the opposed aqueous phase inlet 20. Then the aqueous phase inlet 20 is positioned below the liquid surface, so that the aqueous phase is injected into the liquid. This ensures more effective bubbling of the aqueous phase and more efficient contact with the organic phase. It is also desirable that the total volume of aqueous and organic phases fed to tank 10 be equal to the total volume of aqueous and organic phases discharged from tank 10. As a precaution against the event where the balance of admission and discharge is temporarily broken, the other sidewall 12 may be provided with a baffle or L-shaped plate 70 enclosing organic phase outlet 40, and organic phase outlet 40 be positioned below aqueous phase inlet 20, as shown in FIG. 3.

Sometimes the organic phase inlet 30 is designed so that the organic phase may be injected from spray nozzle 31 in upward and transverse directions. Preferably, the organic phase inlet 30 is slightly spaced apart from the bottom as shown in FIG. 1 so that the organic phase may be injected from spray nozzle 31 in all vertical and transverse directions. This ensures more effective bubbling of the organic phase and more efficient contact with the aqueous phase.

The liquid-liquid extraction unit mentioned above is used to extract and separate rare earth elements, for example. An aqueous phase containing rare earth elements is admitted from aqueous phase inlet 20 in bubble form into an upper interior of tank 10. An organic phase containing an extractant is admitted from organic phase inlet 30 in bubble form into a lower interior of tank 10. The organic and aqueous phases once admitted moves horizontally (or longitudinally) from the one sidewall side to the opposite sidewall side of tank 10 while exchanging their position upward and downward. Due to a difference of specific gravity, the aqueous phase moves downward from above, and the organic phase moves upward from below. While the organic and aqueous phases exchange their position upward and downwardly, they are effectively contacted mutually whereby the selected rare earth element is extracted from the aqueous phase into the organic phase. While the organic and aqueous phases move moderately toward the opposite sidewall 12 of tank 10, the organic phase and aqueous phase are separated upward and downward. The organic phase having the selected rare earth element extracted therein is discharged from organic phase outlet 40, and the aqueous phase discharged from aqueous phase outlet 50. If the aqueous phase contains a plurality of rare earth elements, at least one of which is not extractable with the organic phase, then the unextractable rare earth element is left in the aqueous phase and discharged from aqueous phase outlet 50.

In another embodiment, the liquid-liquid extraction unit includes a partition 60 disposed at a horizontal (or longitudinal) intermediate position in extraction/separation tank 10 as shown in FIG. 2. The partition 60 divides the interior of tank 10 into a contact compartment 13 including aqueous phase inlet 20 and organic phase inlet 30 and a separation/recovery compartment 14 including organic phase outlet 40 and aqueous phase outlet 50. A space is left between the lower edge of partition 60 and the bottom of tank 10 for communication for the aqueous phase near the bottom. Also the height of partition 60 is lower than the sidewalls of tank 10 so that the organic phase may flow across the partition 60 from contact compartment 13 to separation/recovery compartment 14. The upper edge of partition 60 is preferably at a position equal to or slightly higher than spray nozzle 21 of aqueous phase inlet 20, and also preferably at a slightly lower position than the discharge port of organic phase outlet 40.

In the embodiment wherein partition 60 is provided to divide the interior of tank 10 into contact compartment 13 and separation/recovery compartment 14, a higher extraction/separation efficiency is expectable. Specifically, once the aqueous phase and organic phase are injected from spray nozzles 21 and 31, partition 60 blocks them and prevents them from directly moving toward outlets 40 and 50; in contact compartment 13, the aqueous and organic phases exchange their position downward and upward, with extraction reaction taking place; the aqueous phase moves into separation/recovery compartment 14 via the lowermost space near the bottom, and the organic phase overflows the top of partition 60 into separation/recovery compartment 14. In separation/recovery compartment 14, further separatory motion takes place between aqueous and organic phases while the impact of jets from nozzles 21 and 31 is substantially eliminated by partition 60. Thus a high extraction/separation efficiency is available.

The position of partition 60 is not particularly limited and may be determined depending on the volume, horizontal length and height of tank 10, the flow rates of aqueous and organic phases, and the like. In the case of extraction/separation tank 10 having a rectangular bottom as shown in FIGS. 1 and 2, partition 60 is preferably disposed at any position between the longitudinal center of the bottom and the one sidewall (liquid inlet side) of tank 10 so that separation/recovery compartment 14 may have a volume equal to or larger than the volume of contact compartment 13. Then separation/recovery compartment 14 assuming a nearly stationary state offers a longer dwell time, achieving more effective separation between aqueous and organic phases.

It is noted that although spray nozzles 21 and 31 are used to inject the aqueous and organic phases in bubble form in the embodiments of FIGS. 1 and 2, any means of admitting bubbles of the aqueous and organic phases into tank 10 may be used instead of the spray nozzles. Also, although spaces are provided below and above partition 60 for fluid communication in the embodiment of FIG. 2, it is acceptable that partition 60 is extended from the top to the bottom of tank 10 and perforated in lower and upper portions thereof with ports for fluid communication. Further, the shape of tank 10 is not limited to FIGS. 1 and 2. Any tank shape is acceptable as long as liquid phases move vertically up and down like a spray column, or as long as aqueous phase and organic phase move vertically up and down and move horizontally whereby the aqueous and organic phases admitted from one sidewall side at upper and lower positions are discharged from the opposite sidewall side at inverse (lower and upper) positions.

The liquid-liquid extraction unit in one embodiment of the invention may be used to construct a multistage liquid-liquid extraction apparatus. There are provided a plurality of liquid-liquid extraction units, which are connected such that the organic phase discharge line 41 of one unit is connected to the organic phase feed line 32 of another unit, and the aqueous phase discharge line 51 of the one unit is connected to the aqueous phase feed line 22 of the other unit. Then extraction operation is performed in multiple stages. When the step of extracting a rare earth element in the aqueous phase into the organic phase, the step of scrubbing the organic phase, and the step of back extracting the rare earth element from the organic phase for recovery are continuously carried out, at least one (one, two or all) of the extraction section, the scrubber section and the back-extraction section may be a multistage liquid-liquid extraction apparatus comprising liquid-liquid extraction units.

As mentioned above, the liquid-liquid extraction unit in one embodiment of the invention comprises an extraction/separation tank 10, an aqueous phase inlet 20 in an upper portion of one sidewall, an organic phase inlet 30 in a lower portion of one sidewall, an organic phase outlet 40 in an upper portion of the opposite sidewall, and an aqueous phase outlet 50 in a lower portion of the opposite sidewall, wherein the organic and aqueous phases are admitted in bubble form from one sidewall, move horizontally (or longitudinally) while exchanging their position upward and downward, and are discharged from the opposite sidewall. While the bubbly aqueous phase and the bubbly organic phase exchange their position upward and downward, an effective mutual contact occurs therebetween. Then effective extraction takes place due to interfacial reaction, and phase separation proceeds at the same time. Extraction and separation operation can be performed in a small volume and small area without a loss of efficiency, and without a need for a large volume settler chamber as in a prior art mixer-settler.

In the liquid-liquid extraction unit of the invention, not only the organic phase and the aqueous phase exchange their position upward and downward, but also they move vertically and horizontally before they are discharged out. The unit maintains an acceptable efficiency and achieves a high flow rate comparable to the flow rate in the prior art mixer-settler. The size of the unit is significantly small as compared with the prior art mixer-settler. When a multistage extraction apparatus comprising a plurality of units and a multistage continuous extraction system in which a plurality of multistage extraction apparatus are connected for fluid communication are constructed, the footprint can be significantly reduced, and the volume of liquid necessary for extraction can be significantly reduced. These contribute to a substantial reduction of cost required for extraction and separation of rare earth elements.

Example

Examples of the invention are given below by way of illustration and not by way of limitation.

Comparative Example

Figure 5:
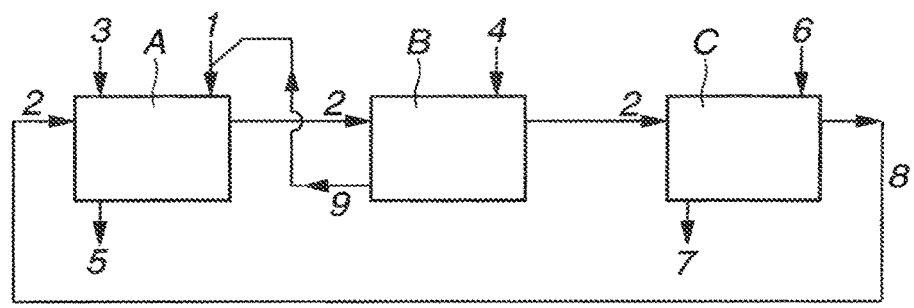
FIG. 5 is a block diagram of a prior art multistage continuous extraction system for extraction and separation of rare earth elements.
Figure 6:
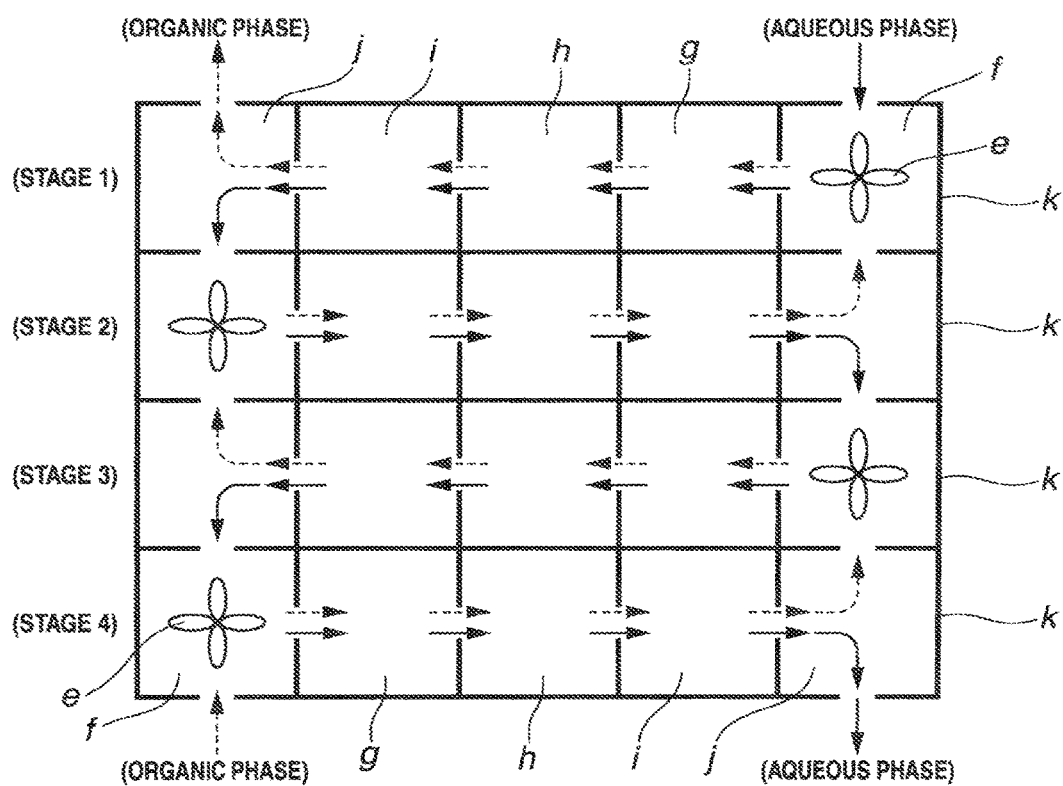
FIG. 6 schematically illustrates a mixer-settler constructing the prior art multistage continuous extraction system.

A prior art multistage counterflow mixer-settler as shown in FIGS. 5 and 6 was used to carry out extraction and separation of rare earth elements (praseodymium and neodymium).

The multistage counterflow mixer-settler system of FIG. 5 includes an extraction section A of 32 stages, a scrubber section B of 32 stages, and a back-extraction section C of 8 stages. One stage is constructed by the mixer-settler of FIG. 6 in which the mixer chamber f is dimensioned 80 mm (W)×80 mm (D)×200 mm (H), the settler consisting of four chambers g to j is dimensioned 320 mm (W)×80 mm (D)×200 mm (H), and one stage is thus dimensioned 400 mm (W)×80 mm (D)×200 mm (H). Extraction section A having 32 stages connected is combined with scrubber section B having 32 stages connected, to construct an extraction section plus scrubber section A+B of 64 stages which is dimensioned 400 mm×5120 mm×200 mm (H). The volume of liquid necessary to fill the extraction section plus scrubber section A+B was 328 L.

A solution was prepared by dissolving extractant PC-88A (mono-2-ethylhexyl 2-ethylhexylphosphate) in kerosene in a concentration of 0.5 mol/L and used as the organic phase. A mixed aqueous solution, 1000 L, containing praseodymium and neodymium in a molar ratio Pr:Nd of 1:1 and a concentration of 0.1 mol/L of Pr+Nd was prepared and used as the aqueous phase.

In FIG. 5, the aqueous phase from line 1 was fed at a flow rate of 6 L/hr, the organic phase from line 2 was fed at a flow rate of 19 L/hr, and a 4 mol/L sodium hydroxide aqueous solution from line 3 was fed at a flow rate of 1.5 L/hr to extraction section A where neodymium in the aqueous phase was extracted into the organic phase. The organic phase was fed to scrubber section B while the aqueous phase was discharged through line 5 at a flow rate of 8.4 L/hr and recovered. In scrubber section B, a 5.5 mol/L hydrochloric acid aqueous solution from line 4 was fed at a flow rate of 0.9 L/hr as the aqueous phase, whereby the organic phase 2 is scrubbed in that praseodymium (which was contained in the organic phase and which should essentially remain in the aqueous phase in extraction section A) was selectively extracted into the hydrochloric acid solution (aqueous phase) 4. The organic phase 2 is fed to back-extraction section C. On the other hand, the hydrochloric acid solution (aqueous phase) having selectively extracted therein the praseodymium (to remain in the aqueous phase in extraction section A) is discharged through line 9 and fed back to line 1. Next, a 5.5 mol/L hydrochloric acid aqueous solution from line 6 was fed at a flow rate of 1.2 L/hr as the aqueous phase to back-extraction section C, where neodymium was back extracted from the organic phase to the hydrochloric acid aqueous solution (aqueous phase), which is discharged through line 7 at a flow rate of 1.2 L/hr and recovered. On the other hand, the organic phase is discharged from back-extraction section C through line 8 and fed back to extraction section A, completing circulation. The extraction and separation operation from extraction section A to back-extraction section C was performed in an environment at a temperature 35° C.

After the extraction and separation operation, the concentration of praseodymium and neodymium in the aqueous phase recovered from line 5 and the hydrochloric acid solution recovered from line 7 was measured by an ICP atomic emission spectrometer. The hydrochloric acid solution recovered from line 7 had a neodymium concentration of 0.03 mol/L and a neodymium purity (Nd/(Pr+Nd)) of 99.5%. The aqueous phase recovered from line 5 had a praseodymium concentration of 0.03 mol/L and a praseodymium purity (Pr/(Pr+Nd)) of 99.6%.

Example

Figure 4:
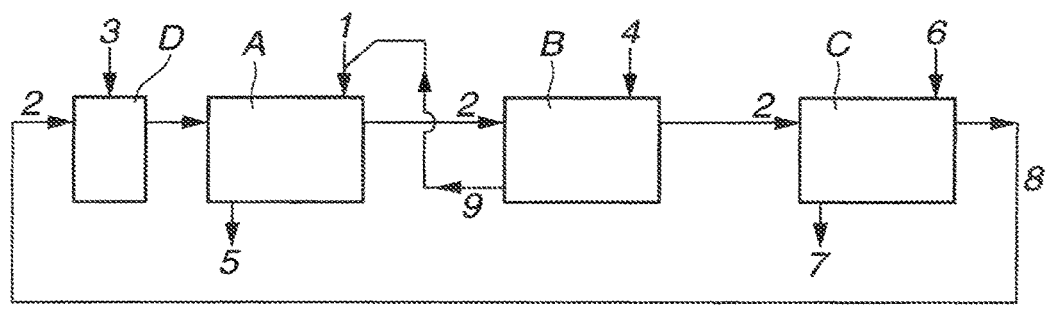
FIG. 4 is a block diagram of one exemplary multistage continuous extraction system for extraction and separation of rare earth elements, comprising liquid-liquid extraction units, in another embodiment of the invention.

A multistage continuous extraction system was constructed as shown in FIG. 4. The system construction was the same as in FIG. 5 in Comparative Example except that extraction section A and scrubber section B were constructed using the liquid-liquid extraction units as shown in FIG. 2, and an alkali mixing section D for mixing a sodium hydroxide aqueous solution 3 with the organic phase 2 was disposed upstream of extraction section A. The back-extraction section C of 8 stages was constructed using a mixer-settler as in Comparative Example. The alkali mixing section D is a vessel dimensioned 80 mm×80 mm×200 mm and equipped with an impeller where the sodium hydroxide aqueous solution from line 3 is uniformly mixed with the organic phase 2 before the liquid is discharged or fed to extraction section A.

The liquid-liquid extraction unit shown in FIG. 2 is dimensioned 120 mm (W)×80 mm (D)×200 mm (H). A partition 60 of 5 mm×80 mm×170 mm (H) is disposed at a distance of 60 mm from one sidewall and spaced 5 mm apart from the bottom to divide the tank 10 into a contact compartment 13 and a separation/recovery compartment 14 of substantially the same volume. Each of spray nozzles 21 and 31 is a conical tube with a closed tip having 30 orifices (diameter 1 mm) perforated in its circumferential surface. An extraction section A of 32 stages is constructed by connecting 32 liquid-liquid extraction units, and a scrubber section B of 32 stages is constructed by connecting 32 liquid-liquid extraction units.

The extraction section A constructed by a multistage liquid-liquid extraction apparatus comprising 32 liquid-liquid extraction units connected is combined with the scrubber section B constructed by a multistage liquid-liquid extraction apparatus comprising 32 liquid-liquid extraction units connected, to construct an extraction section plus scrubber section A+B of 64 stages which is dimensioned 120 mm×5120 mm×200 mm (H). The footprint of this extraction section plus scrubber section A+B was 3/10 of that in Comparative Example. The volume of liquid necessary to fill the extraction section plus scrubber section A+B was 98 L. The necessary liquid volume was also 3/10 of that in Comparative Example.

Next, using the multistage continuous extraction system of FIG. 4, extraction and separation of praseodymium and neodymium was carried out as in Comparative Example. Since the solutions fed from the lines and the flow rates of admission and discharge were the same as in Comparative Example, the same reference characters as in Comparative Example (FIG. 5) are used in FIG. 4 and the description of extraction/separation operation is omitted.

The concentration of praseodymium and neodymium in the aqueous phase recovered from line 5 and the hydrochloric acid solution recovered from line 7 was measured by the ICP atomic emission spectrometer. The hydrochloric acid solution recovered from line 7 had a neodymium concentration of 0.03 mol/L and a neodymium purity (Nd/(Pr+Nd)) of 99.5%. The aqueous phase recovered from line 5 had a praseodymium concentration of 0.03 mol/L and a praseodymium purity (Pr/(Pr+Nd)) of 99.6%. It was proven that separation and extraction rates equal to Comparative Example were available.

It has been demonstrated that using the liquid-liquid extraction unit of the invention, a multistage liquid-liquid extraction apparatus and system can be reduced in size while maintaining a satisfactory extraction efficiency. The footprint can be significantly reduced. The volume of liquid necessary for processing can be significantly reduced. The cost required for extraction and separation of rare earth elements can be significantly reduced.

Japanese Patent Application No. 2012-005224 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of liquid-liquid extraction of a substance, comprising:
    contacting an aqueous phase and an organic phase to each other in a tank by introducing aqueous phase into an upper portion of one sidewall of the tank, and introducing organic phase into a lower portion of one sidewall of the tank, wherein at least one of the aqueous phase and the organic phase is introduced in bubble form, the organic phase moves from the lower portion to the upper portion contacting with the aqueous phase, the aqueous phase moving from the upper portion to the lower portion contacting with the organic phase, thereby transferring the substance between the aqueous phase and the organic phase, the aqueous phase and the organic phase move horizontally while exchanging their position upward and downward,
    separating the aqueous phase and the organic phase by discharging the organic phase from the upper portion of the opposite sidewall of the tank, and discharging the aqueous phase from the lower portion of the opposite sidewall of the tank,
    wherein a sodium hydroxide solution is uniformly mixed with the organic phase before the organic phase is introduced into the tank.

2. The method of claim 1, wherein at least one of the aqueous phase and the organic phase is introduced in bubble form through a spray nozzle.

3. The method of claim 1, further comprising recovering the substance from the organic phase discharged from the tank.

4. The method of claim 3, further comprising recycling the organic phase after recovering the substance.

5. The method of claim 4, wherein at least the contacting step is repeated before recovering the substance.

6. The method of claim 1, further comprising recovering the substance from the aqueous phase discharged from the tank.

7. The method of claim 6, further comprising recycling the aqueous phase.

8. The method of claim 7, wherein at least the contacting step is repeated before recovering the substance.

9. The method of claim 1, wherein the tank comprises
a partition disposed between horizontally opposed sidewalls thereby dividing the tank into a contact compartment and a separation/recovery compartment,
the aqueous phase and the organic phase are introduced into the contact compartment,
the organic phase and the aqueous phase are discharged from the separation/recovery compartment, and
the contact compartment and the separation/recovery compartment communicate each other in the upper portion and the lower portion providing fluid communication for the aqueous phase and the organic phase.

10. The method of claim 1, wherein the tank is a parallelepiped tank having a rectangular bottom and a pair of longitudinally opposed sidewalls as the pair of horizontally opposed sidewalls.

11. A method of continuous extraction for extracting a rare earth element, comprising:
extracting at least one rare earth element by contacting an organic phase containing an extractant with a first aqueous phase in the form of an aqueous solution containing rare earth elements, and separating the first aqueous phase and the organic phase;
back-extracting the rare earth element into a second aqueous phase for recovery by contacting the organic phase having the rare earth element extracted from the first aqueous phase with the second aqueous phase in the form of an acid aqueous solution and separating the second aqueous phase and the organic phase,
wherein the organic phase after back-extracting is fed back to the extracting step,
one or both of the extracting step and the back-extracting step is carried out by repeating the method of claim 1.

12. The method of claim 11, wherein the rare earth element which remains in the first aqueous phase without being extracted into the organic phase is further recovered from the aqueous phase after extraction.

13. A method of liquid-liquid extraction of rare earth element, comprising:
extracting a first rare earth element into an organic phase by contacting a first aqueous phase containing rare earth elements with the organic phase containing an extractant, and separating the organic phase and the first aqueous phase,
a back-extracting the first rare earth element into a second aqueous phase by contacting the organic phase having the first rare earth element extracted therein with the second aqueous phase in the form of an acid aqueous solution and separating the organic phase and the second aqueous phase, and
between the extracting step and the back-extracting step,
scrubbing the organic phase to extract a second rare earth element, which is incidentally contained in the organic phase and should have remained in the first aqueous phase, by contacting the organic phase with a third aqueous phase in the form of an acid aqueous solution, and separating the organic phase from the third aqueous phase, and delivering the organic phase after scrubbing to the back-extraction section,
wherein the third aqueous phase having the second rare earth element extracted from the organic phase in the scrubbing step is fed back to the extracting step, the organic phase after back-extracting is fed back to the extraction step,
the first aqueous phase discharged from the extracting step is recovered for thereby recovering the rare earth elements including the second rare earth element, which remains in the first aqueous phase without being extracted into the organic phase, and
at least one of the extracting step, the back-extracting step and the scrubbing step is carried out by repeating the method of claim 1.

* * * * *